United States Patent
Loth

[19]

[11] Patent Number: 5,971,327
[45] Date of Patent: Oct. 26, 1999

[54] MESOFLAP PASSIVE TRANSPIRATION SYSTEM AND METHOD FOR SHOCK/BOUNDARY LAYER INTERACTION CONTROL

[75] Inventor: Eric Loth, Champaign, Ill.

[73] Assignee: The Board of Trustees of the University of Illinois, Urbana, Ill.

[21] Appl. No.: 09/123,962

[22] Filed: Jul. 29, 1998

[51] Int. Cl.$^6$ .................................................. B64C 21/00
[52] U.S. Cl. .......................... 244/204; 244/207; 244/208; 244/209
[58] Field of Search .................................. 244/204, 207, 244/208, 209

[56] References Cited

U.S. PATENT DOCUMENTS

| | | | |
|---|---|---|---|
| 4,000,869 | 1/1977 | Wong et al. | 244/53 B |
| 4,146,202 | 3/1979 | Pender | 244/209 |
| 4,522,360 | 6/1985 | Barnwell et al. | 244/204 |
| 4,664,345 | 5/1987 | Lurz | 244/209 |
| 4,726,548 | 2/1988 | Clites | 244/209 |
| 5,366,177 | 11/1994 | DeCoux | 244/201 |
| 5,590,854 | 1/1997 | Shatz | 244/206 |
| 5,772,156 | 6/1998 | Parikh et al. | 244/209 |

OTHER PUBLICATIONS

R. Bur, Corbel and J. Délery, "Study of Passive Control in a Transonic Shock Wave/Boundary–Layer Interaction", A/AA Journal, Vol. 36, No. 3, March1998, pp. 394–400.

M.C. Gridley and S.H. Walker, "Propulsion Integration Issue for Advanced Fighter Aircraft", presented at the AGARD PEP Symposium on Advanced Aero–Engine Concepts and Controls, Seattle, Washington, Sept. 25–29, 1995, and published in Neuilly–sur–Sein, France.

A. Hamad, J.J. Yeuan and S.H. Shih, "An Investigation of shock Wave Turbulent Boundary Layer Interaction with Bleed through Slanted Slots", A/AA 24th Fluid Dynamics Conference, Orlando, Florida, July 609, 1993.

G.J. Harloff, G.E. Smith, "On Supersonic–Inlet Boundary–Layer Bleed Flow", 33rd Aerospace Science Meeting and Exhibit, Jan. 9–12, 1995, Reno, Nevada.

Payner, Kneeling, Treiber, "Modeling Supersonic Inlet Boundary Layer Bleed Roughness", A/AA Journal of Prop. and Power, Vol. 9, 1994, pp. 622–627.

S. Raghunathan, "Passive Control of Shock–Boundary Layer Interaction", Progress in Aerospace Science, Vol. 25, 1988, pp. 271–296

*Primary Examiner*—J. Woodrow Eldred
*Attorney, Agent, or Firm*—Greer, Burns & Crain, Ltd.

[57] ABSTRACT

A passive transpiration system for controlling interaction between turbulent boundary layer air and an impinging shock during supersonic airflow by application of a panel including passively activated mesoflaps that direct air circulation through a cavity in response to supersonic airflow. The mesoscopic flaps are preferably arranged in a matrix on one side of a cavity. The flaps deflect to allow air to circulate through the cavity during supersonic airflow, thus controlling the interaction between boundary layer air and air from the impinging shockwave. The flaps open to varying degrees depending on the speed of the airflow. The preferred structure includes channel sidewalls arranged parallel to one another and open on one end, creating multiple cavities. The sidewalls are connected by struts. Rows of flap support beams are connected to the sidewalls. The flaps are connected on one end to the beams, enabling them to deflect over their remainder in response to aerodynamic pressures. This structure enables the flaps to open air pathways into the cavity in response to supersonic airflow and to close the cavity to airflow in response to subsonic conditions without a priori knowledge of the precise spanwise and streamwise location of the shockwave.

13 Claims, 2 Drawing Sheets

MESOFLAP PASSIVE TRANSPIRATION SYSTEM AND METHOD FOR SHOCK/ BOUNDARY LAYER INTERACTION CONTROL

FIELD OF THE INVENTION

The present invention relates generally to passive transpiration control of shock/boundary layer interactions caused by supersonic airflow. The invention specifically concerns a panel that directs air circulation through a cavity in response to supersonic airflow to control shock/boundary layer interaction.

BACKGROUND OF THE INVENTION

Shockwaves are encountered when an aircraft reaches supersonic airspeeds. Such shockwaves exert significant forces on the thin layer of air around the aircraft, a component referred to as the boundary layer. These shockwaves interact with the boundary layer and, during strong interactions, can cause the boundary layer to deform. Bubbles and other boundary layer deformations increase drag and may also induce high levels of flow separation. These undesired boundary layer interactions accordingly bring about safety, performance, and longevity concerns, especially when the interactions occur inside of engine inlets.

Previous systems to alleviate such interactions have been developed. These systems bleed or circulate the air near the boundary layer to suppress shockwave induced flow separation. Active systems require some sort of ducting and/or pumping to bleed the air. Passive systems circulate airflow with holes above a cavity and require no automized labor.

Currently, most high-speed (above Mach 2) military aircraft employ active bleed transpiration systems for their engine inlets. Typical active systems include a plenum, covered with a fixed, flat porous or perforated plate. The plate draws the boundary layer air into the plenum and then through ducts. The ducts lead to a chamber which has a door. The door is controlled by a conventional actuator to open in predetermined increments to satisfy the varying bleed requirement for the shock compression. Expense, weight, drag, and complexity are the primary drawbacks to such conventional systems. In addition, much design effort is required to determine the location for the bleed intakes. This involves determining likely locations for shockwaves experienced during supersonic flight. Active bleed systems also lack an important benefit of passive systems that include injection upstream of the shock. The upstream injection allows additional thickening of the boundary layer upstream of shock, producing a system of weaker shocks, which thereby reduce wave drag and the intensity of the shock footprint.

Passive transpiration, which typically combines bleed downstream of the shock with flow injection upstream of the shock, is ideally preferable because it reduces the wave drag and intensity of the shock, and it does not require pumping power or ducting to or from the transpiration cavity. Current passive transpiration systems generally consist of a porous surface and a cavity underneath. The porous surface can be made of holes or slots. During supersonic flight, the changes in pressure will cause air downstream of the shock impingement to flow into the holes, through the cavity and then out through the holes upstream of the impingement. These systems have reduced mechanical complexity and expense compared to the conventional active transpiration systems. However, present models for passive transpiration systems have disadvantages. Transpiration rates are typically insufficient for effective boundary layer control due to the small hole size. Also, in general, the system requires holes or slots that are normal to the transpiration plate, creating a geometry that is significantly less effective than angled holes for bleeding purposes. Further, the holes can yield increased drag at lower Mach speeds or subsonic air flight because of their continuous open state. This potential leads to the same design concerns experienced in needing to determine the location of shock boundary interaction in a particular aircraft so the holes can be limited to that area. Otherwise, drag losses become too significant.

A more recently developed passive transpiration system limits drag by using holes that are micrometric in diameter on a sheet with a thickness on the order of micrometers. Subsonic drag effects are controlled, but other problems potentially arise. The thin nature of the sheet is a structural limitation which limits the porosity and effectiveness of the system. From a manufacturing perspective, difficulties are introduced as a result of the micrometric size of the holes. Because of the small size of the holes, they need to be made utilizing an electron beam technique or other similarly sophisticated micro machining technique, which creates a substantial expense as well as an impediment to mass manufacture.

Thus, there is a need for an improved passive transpiration method and system which addresses drawbacks in conventional systems. More specifically, there is a need for an improved passive transpiration system that effectively controls shock/boundary layer interaction at supersonic airflows and reduces drag at subsonic airflows. There is a further need for an improved system which provides for some flexibility in placement on an aircraft and uses relatively straightforward manufacturing techniques.

SUMMARY OF THE INVENTION

These and other needs are met or exceeded by the present passive transpiration method and system. The invention uses a panel that has a plurality of mesoscopic flaps, preferably arranged in a matrix on one side of a cavity. The flaps open to direct air circulation through the cavity in response to pressures created by supersonic airflow conditions and reduce the deleterious effect of an impinging shockwave. Bleed flaps are created downstream of a shock by high pressure which deflects the flaps into the cavity while injection flaps are created upstream by low pressure that causes flap deflection to direct airflow out of the cavity. During subsonic airflow conditions, the flaps are shut to effectively close the cavity. This allows for the panel to control shock/boundary interaction during the supersonic airflow conditions, while preventing excess drag during subsonic airflow conditions. This also avoids a "roughening" in the surface during subsonic airflow, which increases drag forces in conventional open slot and hole transpiration systems. Also, by arranging the flaps in matrix formation, the panel can accommodate variations in both the streamwise position and sweep angle of the impinging shock, so that shock locations do not need to be precisely known prior to the construction and use of the panel. Unlike prior passive systems, the air is directed efficiently into an opening created by an upstream flap that is angled as a result of the pressure flap deflection.

The preferred panel comprises a series of parallel channel sidewalls connected by struts. Flap support beams are connected to the channel sidewalls. An upstream end of each of the flaps is attached to a respective beam, enabling them to deflect over their remainder. The flaps are then able to open to varying degrees, depending on the speed of the airflow. This enables the panel to only allow as much air to circulate as is needed to control the shock/boundary interaction, thus operating more effectively and producing less drag. To most effectively allow mass transfer, the flaps should be millimetric or less in thickness and centimetric or less in length and width. Flaps of this size are attainable by metal stamping and other conventional fabrication techniques, allowing the flaps to be manufactured easily.

BRIEF DESCRIPTION OF THE DRAWINGS

Other objects, features and advantages of the present invention will become apparent upon reading the following detailed description, while referring to the attached drawings, in which.

DETAILED DESCRIPTION OF THE INVENTION

The present invention provides a passive air transpiration system that directs air circulation through a cavity in response to supersonic airflow and closes the cavity to inhibit circulation through the cavity in response to subsonic airflow. A panel according to the invention utilizes a plurality of mesoscopic flaps to passively control boundary layer airflow through an underlying cavity. During supersonic flight, the flaps deflect open to direct the flow of the boundary layer air into and then out of the cavity. Circulation of the boundary layer air reduces the occurrence of surface deformation and alleviates the associated drag. The flaps effectively close the cavity to inhibit drag induced by cavity air circulation during subsonic flight.

Figure 1B:
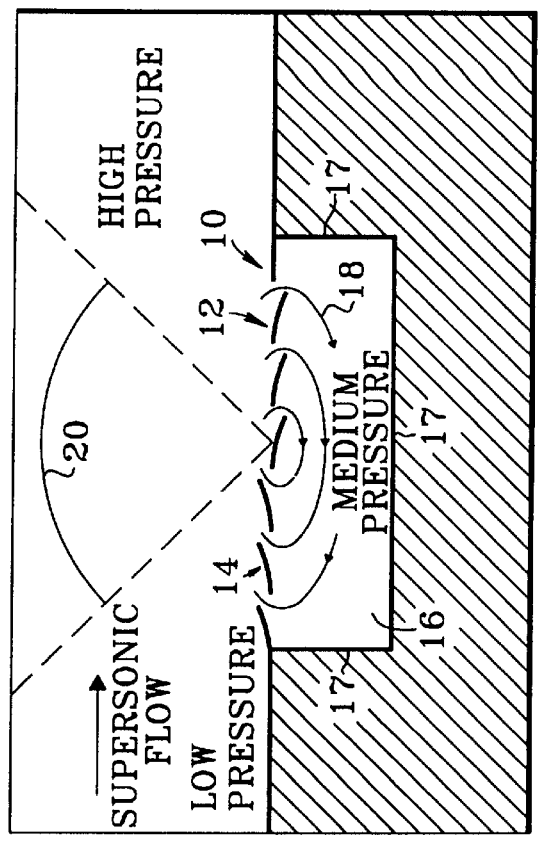
FIG. 1b is a schematic diagram of the mesoflap passive transpiration system according to the present invention in a condition responsive to supersonic airflow.
Figure 1A:
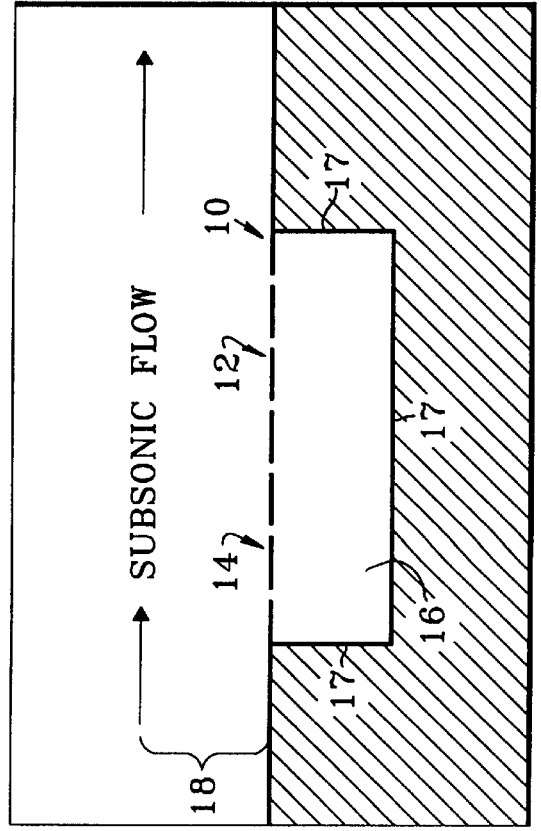
FIG. 1a is a schematic cross-sectional diagram of mesoflap passive transpiration system according to the present invention in a condition responsive to subsonic airflow.

Referring now to FIG. 1a, operation of a mesoflap passive transpiration control system 10 according to the invention is illustrated in a condition responsive to subsonic airflow. The passive transpiration system 10 includes a plurality of injection flaps 12 and bleed flaps 14 which control airflow through a cavity 16 bounded by physical barriers 17 on its remaining sides. During subsonic airflow, the flaps 12, 14 remain closed over the cavity 16. This keeps a system of boundary layer air 18 above the transpiration system 10, allowing for normal airflow. In this condition, the cavity 16 and flaps 12, 14 create no interruption of the boundary layer air 18 because the flaps effectively inhibit air circulation through the cavity 16. Thus, the subsonic flow condition of the mesoscopic flaps 12, 14 is an effectively smooth surface over which boundary layer air 18 passes freely and without interference or added drag. The closed condition of the flaps is maintained under subsonic airflow as a result of the uniform or nearly uniform pressure between the boundary layer 18 and the cavity 16. No-shock conditions indicative of subsonic flow create a nearly constant streamwise pressure distribution on the flaps 12, 14. Thus, the pressure in the cavity 16 is nearly equal to that in the flow above the flaps.

As is known in the art, the transition to supersonic airflow is accompanied by oblique shocks 20, as illustrated in FIG. 1b. Such shocks 20 create strong streamwise pressure variations, with an area of high pressure downstream of the shock 20 and an area of low pressure upstream of the shock 20. The transpiration system 10 of the invention uses the pressure variation created during supersonic airflow conditions to deflect the flaps 12, 14 and create the desired air circulation through the cavity 16. High upstream pressure causes the injection flaps 12 to deflect into the cavity 16 and direct the boundary layer air 18 into the cavity 16. The nearly constant pressure in the cavity 16 will lie roughly between the high downstream pressure and low upstream pressure. Thus, the bleed flaps 14 downstream of the shock 20 deflect out of the cavity to direct the airflow out of the cavity 16, thus circulating the boundary layer 18 as shown in FIG. 1b. By circulating the boundary layer air 18, the transpiration system 10 reduces the interaction between the boundary layer air 18 and an oblique shock 20 that occurs at supersonic airflow conditions. The flaps 12, 14 direct the boundary layer air 18 into and out of the cavity 16 at an angle. Angled active bleed systems have been previously shown to be more effective in controlling the interaction between the shock 20 and the boundary layer 18 than passive systems that direct perpendicular airflow, so the invention significantly achieves the superior angled flow without the complexity of the active systems.

The flaps 12, 14 also deflect open at varying degrees depending on the speed of the airflow. As the airflow reaches higher Mach numbers, the flaps 12, 14 open to a larger degree, thereby circulating more boundary layer air 18 through the cavity 16. Thus, the passive transpiration system 10 controls boundary layer air 18 and shock 20 interaction at the higher Mach speeds, while also preventing excess drag during lower Mach speeds.

It is also important to observe the locational flexibility of the present system 10. It is the location of the impinging shockwave which determines which of the flaps are injection flaps 12 and which of the flaps are bleed flaps 14. Artisans will appreciate that much of the need for a priori knowledge about the location of the shockwave is accordingly eliminated. Using panels constructed according to the invention in any general area in which the shockwaves are a concern eliminates need for advanced knowledge of streamwise shockwave locations in an aircraft including the panels.

Figure 2:
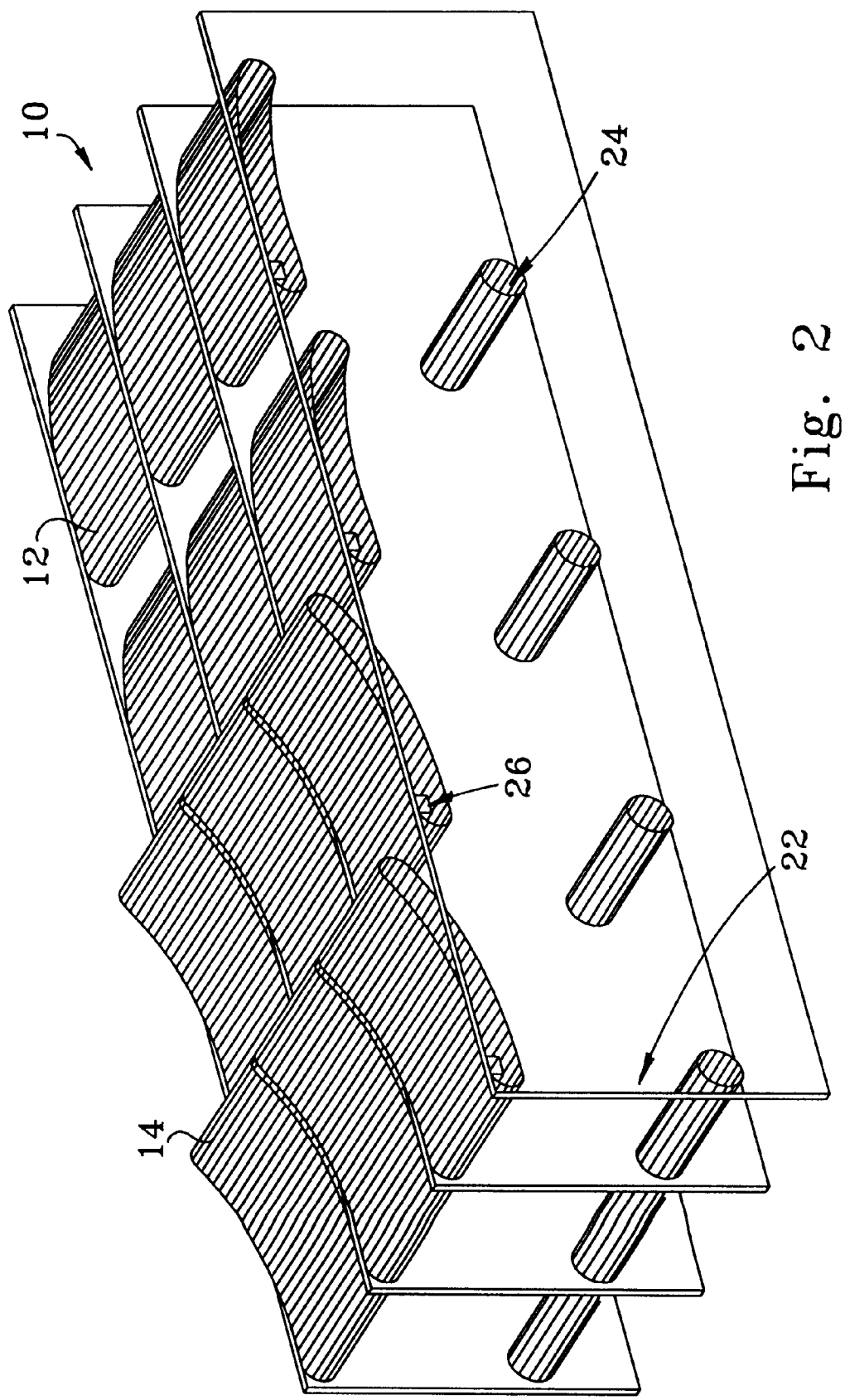
FIG. 2 is a perspective and partially see-through view of a preferred mesoflap panel array in a condition responsive to supersonic airflow.

The uniform construction is best appreciated with reference to FIG. 2. The preferred physical barriers 17 are a plurality of parallel channel sidewalls 22. A plurality of support struts 24 are used to hold the sidewalls 22 in the illustrated arrangement. The flaps 12, 14 are connected to the sidewalls 22 by a plurality of flap support beams 26, such that all support beams are upstream of the remainder of their respective flaps. The preferred matrix formation allows the boundary layer air 18 in both the streamwise and spanwise direction to be circulated through the cavity 16. With this construction, the spanwise shock impingement locations also do not need to be precisely known prior to the construction of the transpiration system 10. Other panels for aircraft components can be constructed through use of multiple arrays of the transpiration system 10 of FIG. 2.

Advantageously, the flaps 12, 14 can be constructed out of conventional metal alloys, such as steel or aluminum. However, smart materials exhibiting shape memory are preferred. The mesoscopic size of the flaps pennits simple metal stamping be used to cut the flaps 12, 14 out of a uniform-thickness sheet. The length and width of each flap 12, 14 should be controlled by the size of the boundary layer 18 over a fixed sheet and the size of the impending shock 20. In general, the length and width should be centimetric or less. The thickness of the flaps 12, 14 may be optimized using beam theory and the known shockwave condition and flap 12, 14 material. The thickness must be significantly smaller than the length or width in order to allow efficient mass transfer. Therefore, the thickness of the flaps 12, 14 should be millimetric or less in size. Optimum aerodynamic performance is expected for flaps about 300–700 $\mu$m in thickness (consistent with the sonic thickness of the incoming boundary layer), and for a length to thickness aspect ratio of about 10.

This secured portion of each flap should only account for 10–20% of the length of the flap. This allows high mass flow transfer throughout the flaps 12, 14 system without excessive up or down deflection of the flaps 12, 14. The maximum deflection of the present flaps is 20°. Larger deflections create wakes that reduce boundary layer quality. The rest of each flaps 12, 14 is able to bend freely since it is not connected to the sidewalls 22 or any other beams 26. Connected in this fashion, the flaps deflect locally during supersonic flight in a cantilevered mode in response to the above discussed pressures to achieve the passive bleed and injection of the invention.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A passive transpiration system for shock/boundary interaction control comprising:
   at least one three dimensional physical barrier defining a cavity, said cavity being open on one side;
   a plurality of flaps disposed across at least a portion of said one side of said cavity and being operable to cooperatively close one side of said cavity in response to subsonic airflow conditions over said flaps and to open to permit airflow through said cavity in response to supersonic airflow conditions over said flaps.

2. A passive transpiration system according to claim 1, wherein some of said plurality of flaps open to direct airflow into said cavity and some of said plurality of flaps open to direct airflow out of said cavity.

3. A passive transpiration system according to claim 1, wherein said plurality of flaps open to varying degrees depending upon the speed of airflow through said cavity.

4. A passive transpiration system according to claim 1, wherein said physical barrier includes a plurality of parallel channel sidewalls spaced apart from each other.

5. A passive transpiration system according to claim 4, further comprising support struts between parallel channel sidewalls.

6. A passive transpiration system according to claim 4, further comprising a plurality of flap support beams, connected between parallel channel sidewalls, each securing one of said plurality of flaps at one end thereof to permit deflection around said flap support beam.

7. A passive transpiration system according to claim 6, wherein said flaps and said support beams are arranged in a matrix.

8. A passive transpiration system according to claim 6, wherein approximately 10–20% of the length of each of said flaps is held by its respective support beam.

9. A passive transpiration system according to claim 8, wherein said flaps are centrimetric in length and millimetric in thickness.

10. A passive transpiration system according to claim 1, wherein said flaps open to present angled airflow openings.

11. A passive transpiration system according to claim 1, wherein said plurality of flaps are arranged in matrix.

12. A method for suppressing shock-induced flow separation in a panel subjected to subsonic and supersonic airflow, comprising the steps of:
    opening bleed pathways into a cavity and injection pathways from said cavity in response to supersonic airflow across said panel;
    otherwise keeping said pathways closed.

13. The method of claim 12, wherein said step of opening comprises directing airflow into said cavity through a plurality of angled downstream bleed flaps, and directing airflow out of said cavity through a plurality of angled upstream injection flaps, thereby circulating air through the cavity when said panel is at supersonic speed.

* * * * *

UNITED STATES PATENT AND TRADEMARK OFFICE
CERTIFICATE OF CORRECTION

PATENT NO. : 5,971,327
DATED : October 26, 1999
INVENTOR(S) : Eric Loth

It is certified that error appears in the above-identified patent and that said Letters Patent is hereby corrected as shown below:

Column 1, line 5, insert new paragraph --This invention was made with Government support under Grant F49620-98-1-0381 and Grant F49620-98-1-0490 awarded by the Air Force. The Government has certain rights in the invention.--

Signed and Sealed this

Thirteenth Day of March, 2001

Attest:

NICHOLAS P. GODICI

Attesting Officer

Acting Director of the United States Patent and Trademark Office